Patented Apr. 2, 1940

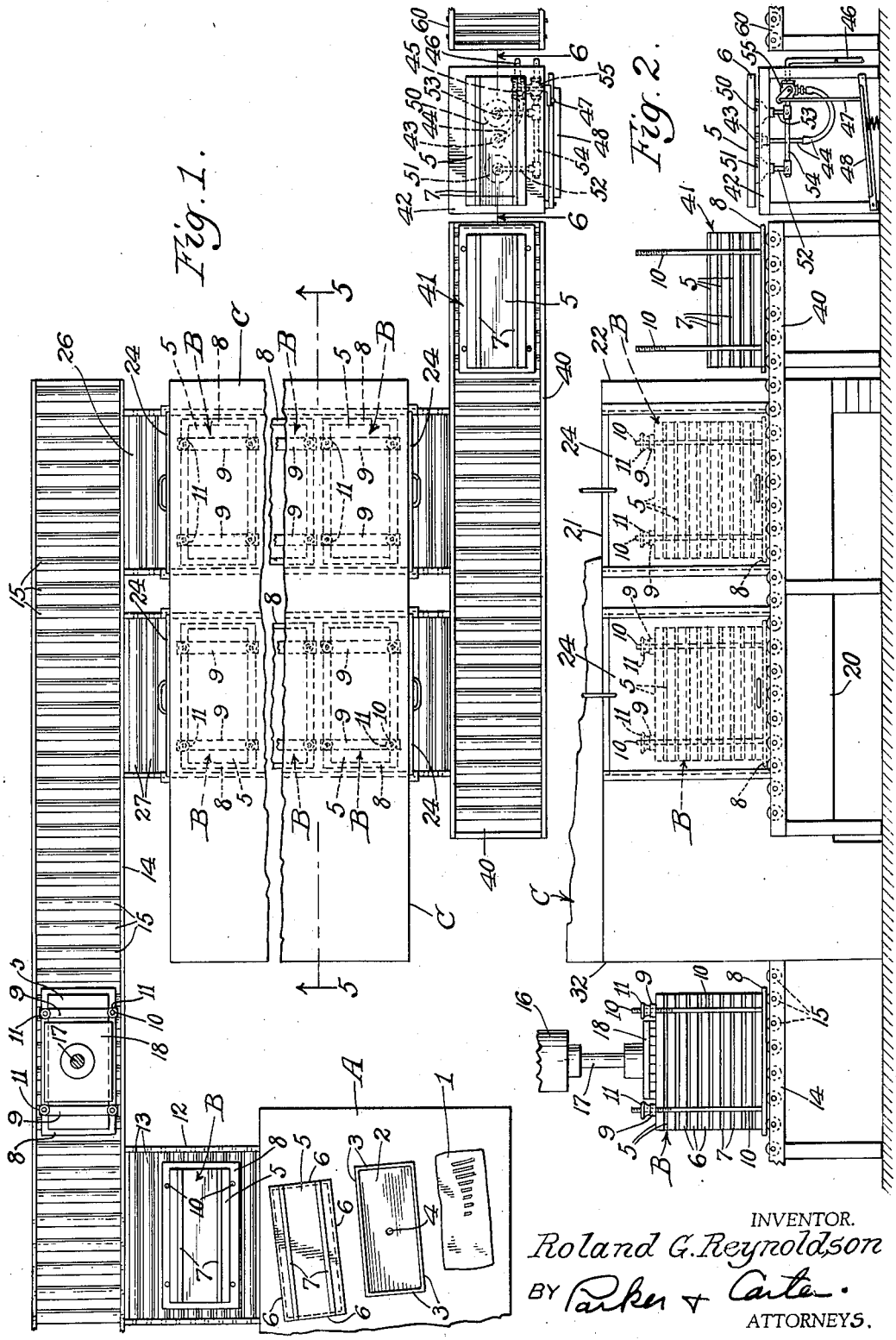

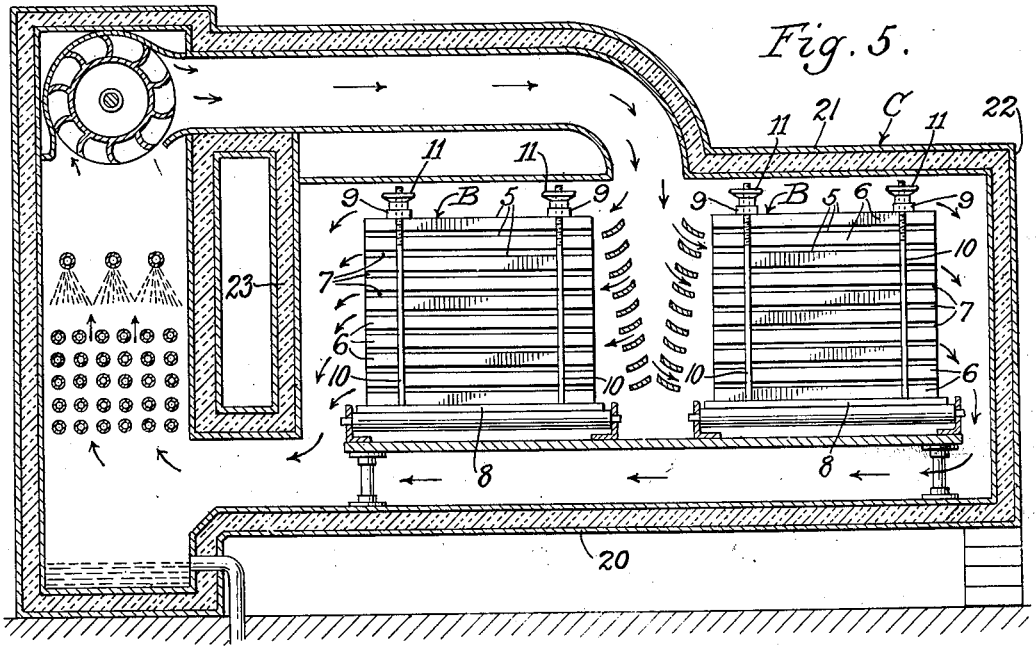
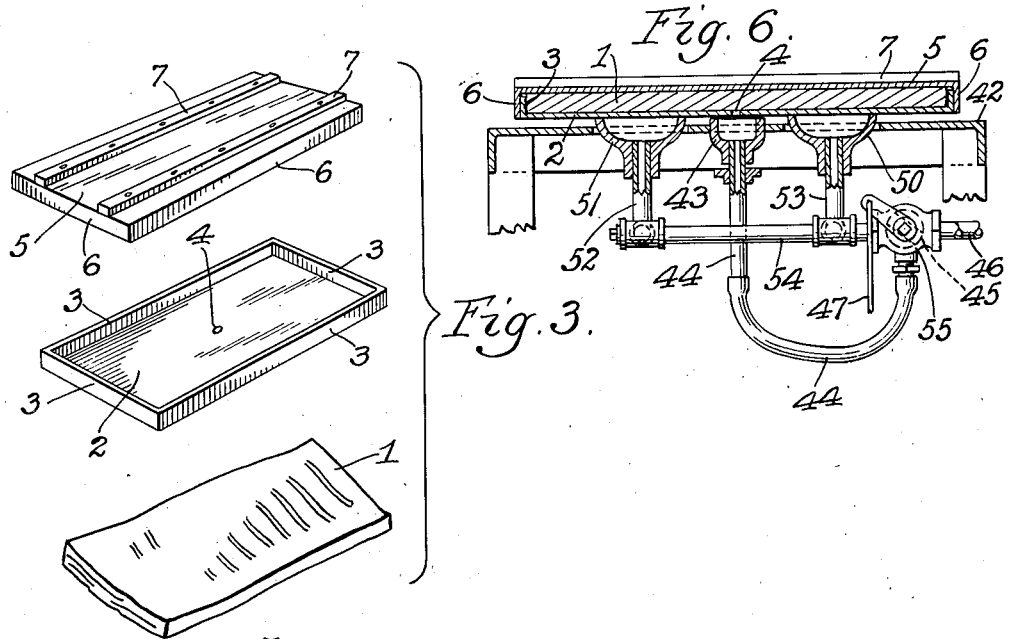
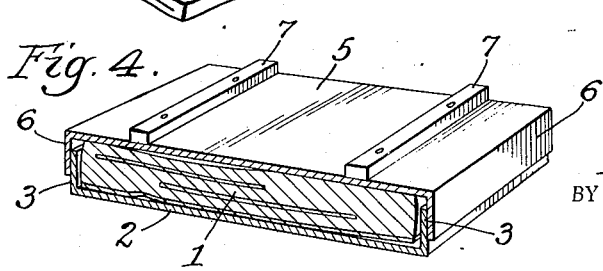

2,196,081

UNITED STATES PATENT OFFICE 2,196,081

DEVICE FOR UNLOADING ARTICLES FROM FORMS

Roland G. Reynoldson, Madison, Wis.

Original application July 18, 1938, Serial No. 219,756. Divided and this application May 1, 1939, Serial No. 271,236

7 Claims. (Cl. 214—1.1)

My invention relates to an improvement in handling articles and has for particular purpose the provision of improved means for removing articles, such as bacon, from containers in which the articles have been pressed, formed or chilled.

Other purposes will appear from time to time in the course of the specification and claims.

The present application is a division of my co-pending application Serial No. 219,756 which was filed on July 18, 1938.

I illustrate my invention more or less diagrammatically in the accompanying drawings wherein:

Fig. 1 is a plan view of a structure for carrying out my invention, including parts employed to fit bacon in forms, from which forms the bacon is thereafter removed;

Fig. 2 is a side elevation of the structure shown in Fig. 1, with parts broken away;

Fig. 3 illustrates the container in which the bacon is positioned for pressing and subsequent freezing;

Fig. 4 is a perspective view partially in section illustrating the bacon within the assembled containers shown in Fig. 3;

Fig. 5 is a section on the line 5—5 of Fig. 1; and

Fig. 6 is a section on the line 6—6 of Fig. 1, on an enlarged scale.

Like parts are indicated by like characters throughout the specification and drawings.

My invention is primarily directed to means for removing or unloading articles from forms. Its utility and mode of operation will be clearer if taken in connection with the following description of a typical forming apparatus and method.

Referring for example to Fig. 1, A indicates any suitable loading platform or table. Illustrated as positioned on the table are the parts shown on a larger scale in Fig. 3. I indicates a piece of bacon. 2 is a container shown as having an open top and side walls 3. 4 indicates a hole in the bottom of the container. 5 indicates a top member having circumferential downwardly extending walls 6 and being provided with spacing cleats 7. The operator places the piece of bacon 1 in the lower container or bottom 2 and positions the top 5 thereupon, as shown in Fig. 4. A stack of such containers is positioned on a bottom clamp member 8.

This container 2, as shown in Fig. 3 and as will later appear, is adapted for the pneumatic or pressure removal of articles within the container after treatment, the hole 4 being adapted to permit the entry of air under pressure within the container and beneath the article contained therein, whereby the top of the container and the article may be pneumatically expelled from or loosened from the bottom. The cleats 7 are important as spacing the containers apart whereby cold air may be circulated between adjacent containers, when they are stacked, for chilling or freezing or for other purposes.

After any suitable number of containers have been positioned upon the bottom clamp member 8, top clamp members 9 may be applied and the members 8 and 9 can be drawn together by any suitable means, for example the compression rods 10 with the nuts 11 screw-threaded to the upper ends of the rods. It will be understood that the particular details of the pressure maintaining means are a matter of choice, but the one shown serves as an illustrative example.

The stack thus produced, indicated as a whole at B, may be moved on any suitable conveyor table 12, which is provided with a plurality of supporting rollers 13. These permit the easy manual movement of the unit B upon the adjacent similar conveyor table indicated as 14, with its rollers 15. 16 diagrammatically illustrates any suitable press member having a plunger 17 and a plunger head 18 adapted to engage the top tray of the stack. Any suitable means may be employed to thrust the members 17 and 18 downwardly against the top tray to compress the individual members 2 and 5 together against the bacon. When the stack is compressed, the nuts 11 may be rotated into bottom position in order substantially to maintain the pressure on the individual slabs of bacon during the freezing period.

It will be clear from Fig. 4 that the thickness of the bacon slab 1 is somewhat greater than the height of the flanges 3 or 6, whereby in response to the thrust of the press each individual piece of bacon is compressed between the top and bottom member which confines it. This causes the bacon to spread out within the container 2 and to conform to the container and take a completely or substantially completely rectangular form. The result is that the finished bacon piece can be evenly sliced with a minimum of wastage, and the bacon can be changed in all three dimensions. Since the containers are uniform in size, or of a predetermined size, the bacon will be formed to that size. If the containers are uniform, all of the bacon pieces will also be uniform in size.

The unit B, after it has been subject to pressure and while the pressure is still maintained by the members 10 and 11, may be moved along the conveyor 14 into alinement with the freezing unit generally indicated as C and shown in vertical section in Fig. 5. As therein shown, it includes a freezing chamber defined by insulated walls. I illustrate a bottom wall 20, a top wall 21, a side wall 22, and an opposite side wall 23. The end walls, not herein shown in detail, are provided with gates 24 which can be raised to permit the insertion and the removal of the units B and which can be lowered to maintain the refrigeration chamber closed, there being such gates at each end of the unit C.

It will be recalled that each container has an aperture 4 in the bottom. Such container may be positioned upon the handling or unloading platform 42 with the hole 4 alined with a cup 43. This cup may be of rubber or any other suitable substance to maintain a tight connection with the bottom of the container 2. 44 indicates an air pressure line in communication with the cup 43 and extending to any suitable source of air pressure. 45 indicates a valve controlling such line 44, and 46 is a line to the pressure source. 47 is an operating rod for the valve 45 which may be controlled manually or by a foot lever or pedal 48 as shown in Fig. 2, whereby the operator can control the delivery of air pressure by his foot. Any suitable means may be employed for biasing the valve 45 to the closed position, whereby it is operated only when the operator presses down on the pedal 48.

50, 51 are suction cups mounted on the support 42 which is apertured to permit their passage therethrough. 52, 53 are suction connections to a suction line 54 which is controlled by a valve 55. The valves 45 and 55 together form a multiple valve structure which may be unitarily controlled by the rod 47 and the pedal 48.

Thus, when the operator presses down on the pedal 48, the initial effect is to open the valve 55 and to subject the interior of the cups 50, 51 to suction. The two valves are preferably so proportioned that the pressure valve 45 is not opened until after the suction valve, so that the effect of the initial downward movement of the pedal 48 is to apply suction without applying pressure. The effect of the suction is to draw the container 2 downwardly firmly against the surface of the support 42. Thereafter, when the pressure valve 45 is opened and pressure is applied to the cup 43, this pressure passes through the aperture 4 and around the bacon 1 and serves to blow the top 5 upwardly from the container 2 sufficiently to free it.

I may if I wish employ in the place of the suction cups 50, 51 any other suitable means for drawing the container downwardly against the top 42 or against any suitable stop means.

After the cover has been removed, the operator tosses it aside or puts it on any suitable conveyor or support, shown for example as the roller conveyor 60 of Fig. 1. Continuation of the pressure serves to blow the bacon piece 1 loose from the bottom container 2 and the operator can toss it upon any suitable conveyor or place it on any suitable support, the details of which do not form part of the present invention.

The operator then removes his foot from the pedal 48 and, the valves being biased to closed position, the pressure and suction are simultaneously cut off and the bottom member or container can then be removed from the table 42 and put on the conveyor 60 or otherwise disposed of. Thereafter, the operator similarly opens each one of the container units until he has finished the stack shown at the position 41 in Fig. 2. He can then move up a new unit B or stack and continue. The operation may be carried on relatively continuously or intermittently.

It will be realized that I have illustrated and described my invention relatively diagrammatically, and that many changes may be made in the size, shape, number and disposition of parts without departing from the spirit of my invention. I therefore wish my description and drawings to be taken as in a broad sense illustrative and diagrammatic, rather than as limiting me to my precise showing.

It will be understood, of course, that whereas I have described my invention as used primarily with bacon, this is but one advantage of its use as it may be employed for other food stuffs or for other articles or substances which are not in the category of food stuffs. Broadly, I deform or mold substances or articles under pressure, thereafter chill or freeze them, and thereby set them, and thereafter free the formed, set articles from the forming molds.

I claim:

1. In a handling table for unloading containers, a top member, a suction cup adapted to draw a container downwardly against said top member when suction is applied to said cup, a suction line in communication with said cup, a normally closed valve in said line, means for directing air pressure into a container held by suction in relation to said top member, in a direction opposite to the direction of suction pull, including a pressure line, a normally closed valve in said pressure line, a movable control member, and an actuating connection between said control member and said suction and pressure valves adapted in response to a predetermined movement of said control member first to open the suction valve and thereafter to open the pressure valve.

2. In a handling table for unloading containers, an extended and generally horizontal top, suction means for holding a superposed container in a predetermined position on said top, and means for directing air pressure into said container, during the operation of said suction means, and in a direction opposite to the direction of suction pull of said suction means.

3. In a handling table for unloading containers, an extended and generally horizontal top, suction means for holding a superposed container in a predetermined position on said top, means for directing air pressure into said container, during the operation of said suction means, and in a direction opposite to the direction of suction pull of said suction means, and unitary control means for the suction means and the pressure means, including a single operating lever in convenient proximity to said table.

4. In a handling table for unloading articles from containers, a support, suction means for drawing a container toward said support, means for directing air pressure into the interior of said container while said container is held by suction in relation to said support, and a unitary control member adapted in response to its movement through a predetermined range, first to put the suction means into action and thereafter to cause the application of said air pressure.

5. In a handling table for unloading articles from containers, a support including a generally horizontal top member, suction means for drawing a container downwardly toward said top member, means for directing air pressure into the interior of said container while said container is held by suction in relation to said top member, and control means for said suction means and said air pressure means.

6. In a handling table for unloading articles from containers, a generally horizontal support, one or more suction cups including edges extending normally to a level above said support, said cups being adapted to receive a container superposed upon the support, means for maintaining a suction within said cups and for thereby urging said container downwardly toward said support, and means for directing air pressure to the interior of said container in a direction opposite to the direction of suction pull, while maintaining said suction.

7. In a handling table for unloading articles from containers, a generally horizontal support, one or more suction cups including edges extending normally to a level above said support, said cups being adapted to receive a container superposed upon the support, means for maintaining a suction within said cups and for thereby urging said container downwardly toward said support, means for directing air pressure to the interior of said container in a direction opposite to the direction of suction pull, while maintaining said suction, and unitary means for successively supplying suction to said cups and for thereafter actuating said air pressure directing means including a unitary handle, a valve controlled thereby, adapted to control said suction, and an additional valve controlled thereby, adapted to control said air pressure.

ROLAND G. REYNOLDSON.